Jan. 5, 1954  D. T. INTAGLIATA  2,664,721
REVERSE CYCLE HEATING AND COOLING SYSTEM
Filed July 11, 1951
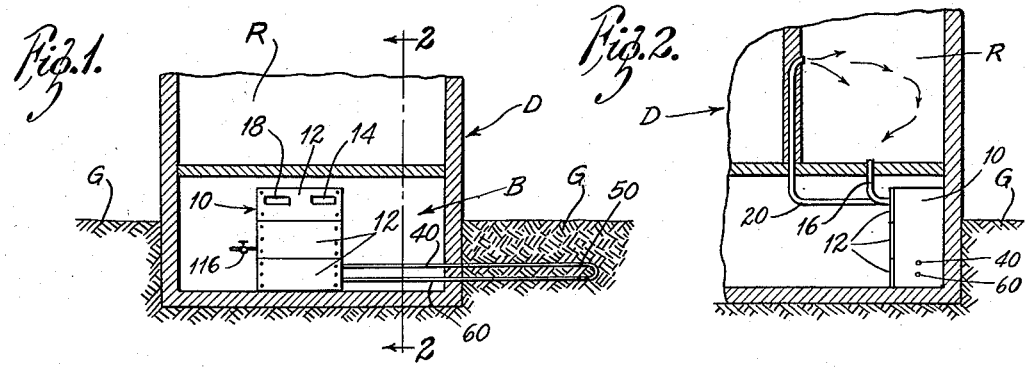
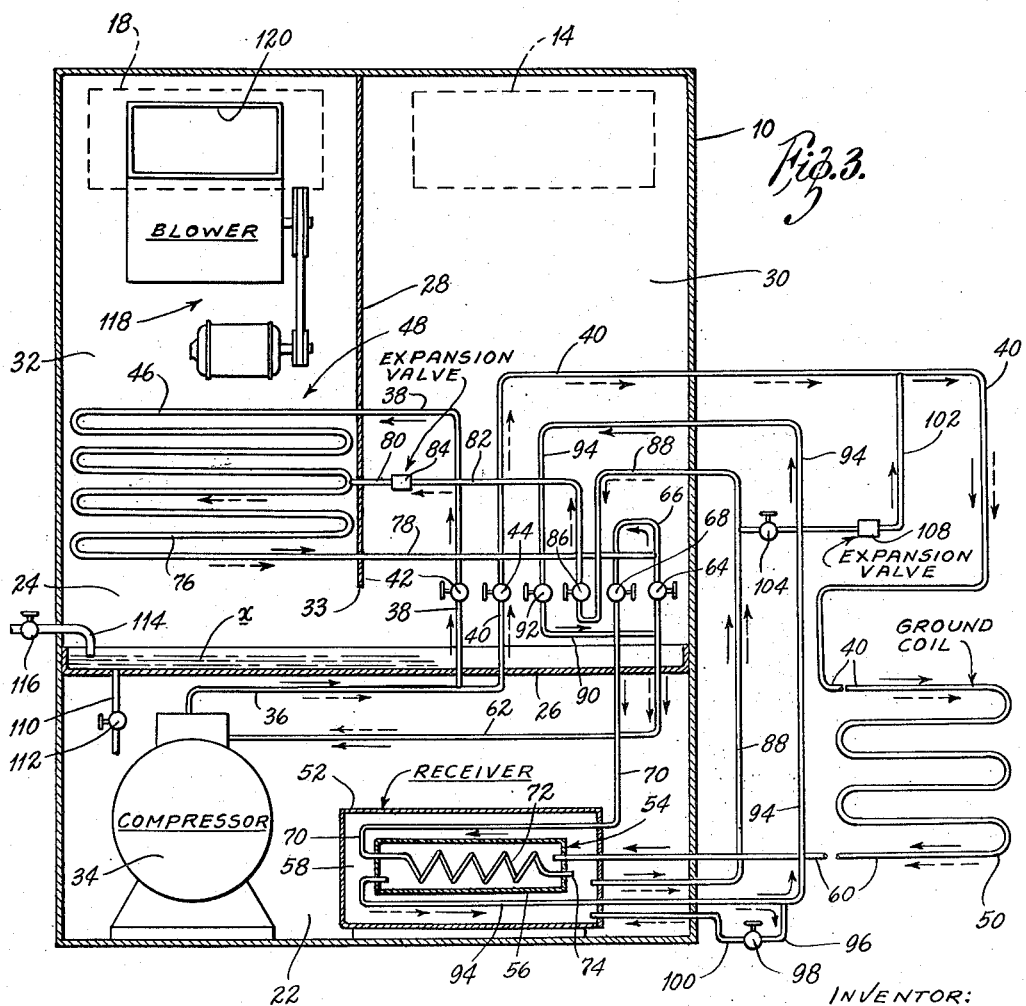
INVENTOR:
DOMINIC T. INTAGLIATA,
BY George J Mager
HIS ATTORNEY

UNITED STATES PATENT OFFICE 2,664,721

REVERSE CYCLE HEATING AND COOLING SYSTEM

Dominic T. Intagliata, St. Louis, Mo.

Application July 11, 1951, Serial No. 236,158

4 Claims. (Cl. 62—129)

The present invention relates to a reverse cycle heating and cooling system designed primarily, though not at all exclusively, for installation in a dwelling or similar building, to regulate the temperature therein. An installation of the instant type is also known as a heat pump.

With the increasing cost of fuels such as coal and oil, together with the decreasing cost of electricity, the present invention provides a system for not only heating, but also for cooling a dwelling or the like economically.

Generally, the invention includes refrigeration apparatus suitably mounted within a cabinet or unit, which can be located on the ground floor, or in the basement of the building, and a coil inserted into the ground outside the building.

The coil is buried several feet below frost level, and is adapted to utilize the heat inherent in the ground at that level in both the heating and the cooling cycles of operation.

One of the principal advantages of the present system is that it eliminates the requirement of both a furnace and refrigeration equipment in the home in order to maintain the desired temperature. The absence of any oxygen consuming fire or flame, smoke, soot, or products of combustion associated with fuels ordinarily used, is another advantage provided by the present invention.

The principal objects of the invention are to provide a system whereby a unit heat-exchange installation may be optionally adjusted to function as a space heating apparatus, or as a space cooling apparatus; to provide a system which when adjusted for either operation will function automatically from then on until adjusted to function in an alternate manner; to provide means for air circulation, heating, and humidification during heating cycles; and to provide means for air circulation, cooling, and dehumidification during cooling cycles.

Other objects and advantages will be pointed out in the detailed description to follow, reference being had to the accompanying drawing which illustrates in diagrammatical fashion, a reverse cycle heating and cooling system in accordance with the teachings of my invention.

In said drawing:

Fig. 1 is a diagrammatic view in vertical section, illustrating the invention installed in the basement of a dwelling or other building;

Fig. 2 is a similar view taken along line 2—2 in Fig. 1;

Fig. 3 is a diagrammatical layout of the system, the heating circuit being indicated by a series of full line arrows, and the cooling circuit by a series of broken line arrows.

As hereinbefore stated, all of the major apparatus included in the system is mounted in a casing, such as that diagrammatically illustrated and designated 10. Although not shown in the drawing, said casing is preferably lined with insulation. Access to the interior of the casing may be had following the removal of one or more front panels 12.

As shown for exemplary purposes in Figs. 1 and 2, casing 10 may be installed in the basement B of a dwelling D so as to regulate the temperature of an upper room R.

The uppermost panel 12 has formed therein an opening 14, to which is connected the discharge end of an air return duct 16, the other end of which terminates along the floor level of room R, as is understood.

Said panel has also formed therein an opening 18, to which is connected the inlet end of an air duct 20, the other end of which terminates along one of the walls of room R, as is also understood.

With reference now to Fig. 3, it is noted that casing 10 is divided into a lower compartment 22, and an upper compartment 24, a horizontally disposed drain pan 26 serving as a separation wall. Also that compartment 24 is divided by a vertical wall 28 into two chambers 30 and 32, the lower end 33 of said wall however, terminating above the drain pan, as shown.

Numeral 34 designates a conventional compressor of the sealed type, mounted in the lower compartment 22. The compressor discharge line 36 has two branches 38 and 40, branch 38 being provided with a manually operable valve 42, and branch 40 with a similar valve 44.

Branch line 38, beyond valve 42, leads to the upper half section 46 of a coil generally designated 48, which is located above the drain pan 26 and in chamber 32. Branch line 40, beyond valve 44, leads to a coil 50, which, as appears in Fig. 1, is imbedded in the ground G preferably outside the dwelling, and below the frost level.

Also mounted in compartment 22, is a receiver tank 52, and suitably supported within said tank is a heat exchange unit generally designated 54. Preferably, but not necessarily, both the tank 52 and the shell 56 of unit 54 are in the form of closed end cylinders, the diameter of shell 56 being smaller than that of the tank. Preferably also, cylinder 56 is of lesser length than the tank, so that a chamber 58 surrounds the heat exchange unit, as should be clear from the drawing.

Leading from ground coil 50, is a line 60, the discharge end of which extends into chamber 58 of shell 56. The compressor suction line is designated 62 and leads to a manually operable valve 64. A line 66 extends from said valve to a similar valve 68, and from the latter, a line 70 leads first into the receiver tank, and then into the left end of shell 56. Within the latter, said line is formed into a coil 72, and terminates in a discharge end portion 74 which projects beyond the right end of said shell into chamber 58.

The lower half section of coil 48 is designated 76, and leading from it and into line 66 at a point intermediate valves 64 and 68, is a line 78.

As diagrammatically shown, the discharge end 80 of a line 82 communicates with the lower half section 76 of coil 48, there being a thermal expansion valve 84 in said line intermediate said coil and a manually operable valve 86. From valve 86, a line 88 extends to receiver 52, with the inlet end portion thereof projecting into chamber 58.

Leading into suction line 62 intermediate the compressor and valve 64, is a branch line 90 under control of a manually operable valve 92. From this valve, a line 94 leads first into receiver 52 and then into shell 56, its inlet end portion terminating within said shell.

Numeral 96 indicates a branch leading from line 94 to a manually operable valve 98, and from the latter to the receiver extends a line 100, the discharge end of which terminates in chamber 58.

In fluid communication at one end with line 40, and at its other end with line 88, is a conduit 102, which is provided with a manually operable valve 104, and a thermal expansion valve 108.

Numeral 110 indicates a drain pipe provided with a hand valve 112, and numeral 114 indicates a water supply pipe provided with a hand valve 116.

Suitably mounted in chamber 32, is a conventional motor driven blower assembly 118, the discharge opening 120 thereof being in sealed communication with the end of duct 20, as is understood.

Before entering into a detailed description of the operation, it is noted that in the interest of clarity, all electrical wiring has been omitted from the drawing. Further, since no claim is made thereto, and since the electrical circuit is conventional for this type of equipment, it is not deemed necessary to include a showing of it in the drawing.

Suffice it to say, that compressor and blower operation is responsive to a conventional wall thermostat located for example, in room R. Thermostats of this type ordinarily operate with a predetermined differential of one or two degrees. Consequently when they are adjusted to a selected point within their range, a change of more than two degrees in the ambient temperature about them will effect the closing of a switch, as is well understood.

The closing of such switch, automatically starts the compressor and the blower, to thereby as will appear, inaugurate the circulation of a refrigerant sealed within the instant system.

With reference to coil 50, it is preferably buried to a depth at which the ground temperature is fifty degrees Fahrenheit. Obviously this depth may vary depending on climatic conditions, and so on. For exemplary purposes, Fig. 1 illustrates said coil as located approximately four feet below ground level.

The conduit portion of the system, including the compressor and receiver, has hermetically sealed therein a predetermined quantity of a volatile refrigerant, Freon being the preferable medium.

*Operation*

As previously noted, changeover of the system is not automatic, being accomplished by manually opening certain valves, and closing others.

Assuming therefore that it is the cold season of the year, and that the temperature desired in room R is seventy degrees Fahrenheit as indicated on the room thermostat, the system is set up for the heating cycle.

To this end, valves 44, 86, 64 and 98 are closed; valves 42, 92, 68 and 104 are opened; valve 112 of the drain pipe is closed; and valve 116 of the water supply pipe is opened until a quantity of water suggested at $x$ partially fills pan 26, whereupon said valve 116 is closed.

Assuming now, that the temperature in room R drops to sixty-eight degrees, compressor 34 and blower 118 begin operation. As a result, and with reference first to compressor operation, the refrigerant in hot vapor form flows through discharge line 36 and branch line 38 into coil 48. As the vaporized refrigerant flows through said coil, it gives up its heat thereto, and passes therefrom via line 78.

It is noted at this time that during the heating cycle, coil 48 functions as a condenser, and that the vaporized refrigerant flows through both the upper and lower half sections, 46 and 76 respectively, thereof.

Valve 64 being closed, the cooled refrigerant in liquid form now travels through line 66, open valve 68, line 70, and coil 72, to be discharged into chamber 58 of receiver tank 52 at 74.

From receiver 52, the liquefied refrigerant proceeds via line 88 through valve 104 and expansion valve 108 into conduit 102, thence into branch 40 to the ground coil, valves 44 and 86 being closed.

As the refrigerant now proceeds through ground coil 50, sufficient natural heat is extracted from the earth to effect the revaporization thereof. The vaporized refrigerant now proceeds via line 60 into the receiver to be discharged into shell 56 of the heat exchanger 54.

From the heat exchanger, the suction in the system draws the superheated refrigerant vapor through line 94, open valve 92, and branch 90 into suction line 62 and on to the compressor.

This completes the heating cycle, which is repeated until the room thermostat is satisfied. That is to say, when the temperature in room R rises to seventy degrees, the thermostat will effect the opening of the switch which controls compressor and blower operations. Opening of said switch automatically shuts off the compressor and the blower motors, rendering the system inactive for the time being. As the room temperature later on again drops below the level indicated on the thermostat, the system once more goes into operation.

During the heating cycle, cool air is drawn from room R through duct 16 and opening 14, into chamber 30 of casing 10, then downwardly beneath the lower edge 33 of wall 28, thence upwardly in chamber 32 through heated coil 48, to the intake side of the blower.

The blower projects the thus heated air through its outlet opening 120, opening 18 and duct 20 into room R whereby to raise the temperature therein, and thereupon to be again drawn into duct 16 for reheating and recirculation.

As the air passes beneath edge 33, it is humidified by the body of water x in pan 26. It is noted that in addition to the air humidifying function, this water pan arrangement also absorbs the electrical heat engendered by the operation of the compressor motor.

Thus, the water in pan 26 is always warm during the heating cycle, which provides for highly efficient humidification. When the water evaporates as is understood, it may be replenished by manipulation of the valve 116. Or, if preferred, an automatic device may be incorporated for this purpose.

From the foregoing, it should be manifest that the instant invention provides a highly efficient heating system which, when once adjusted, requires no further attention.

Assuming now that the warm season of the year is at hand, and that again the temperature desired in room R is to be seventy degrees Fahrenheit as indicated on the room thermostat, the system is set up for the cooling cycle.

To this end, valves 44, 86, 64 and 98 are opened; valves 42, 92, 68 and 104 are closed; valve 112 of the drain pipe 110 is opened; valve 116 of the water supply pipe is closed.

When the temperature in room R rises to seventy-two degrees, compressor 34 and blower 118 begin operation. As a result, and with reference first to compressor operation, the refrigerant in hot vapor form flows through discharge line 36, branch line 40 and its open valve 44, to ground coil 50.

Now, instead of functioning in an evaporator capacity, said ground coil functions in a condenser capacity. In other words, the approximately fifty degree earth temperature being considerably lower than that of the hot gases passing through coil 50, cools them so that they condense, whereby the refrigerant flows from said coil in liquid form via line 60 to the heat exchanger shell 56, wherein it is discharged.

Since valve 92 is closed, and valve 98 is open, the refrigerant then flows from shell 56 via line 94, branch 96, said open valve 98, and line 100 into chamber 58 of receiver 52.

As the compressor continues to operate, the cool liquid refrigerant is advanced from the receiver via line 88, through open valve 86, line 82, expansion valve 84, and line 80, into the lower half section 76 of coil 48, it being borne in mind that valve 104 is closed.

At such time, the lower half section 76 of coil 48 functions in the capacity of an evaporator so that the liquid refrigerant passing therethrough extracts heat by evaporization from the ambient air in chamber 32, thus cooling said coil, and at least partially superheating said refrigerant.

In the latter form, the refrigerant now advances into line 66, and valve 68 being closed, proceeds through open valve 64 into suction line 62 and on to the compressor.

This completes the cooling cycle, which is repeated until the room thermostat is satisfied. In other words, when the temperature in room R drops to seventy degrees, the thermostat will effect the opening of the switch which controls compressor and blower operations. Opening of said switch automatically shuts off the compressor and the blower motors, rendering the system inactive for the time being.

As the room temperature later on again rises above the level indicated on the thermostat, the system once more goes into operation, as should be manifest.

As stated above, during the cooling cycle, only the lower half section 76 of coil 48 is employed. With this arrangement, resistance to the flow of refrigerant is reduced. Thus evaporation of the refrigerant is facilitated, and circulation of the air in chamber 32 is accelerated, as is understood.

During the cooling cycle, warm air is drawn from room R, via duct 16 and opening 14, into chamber 30 of casing 10, then downwardly beneath lower edge 33 of wall 28, thence upwardly through cooled coil 48 to the intake side of the blower.

The blower projects the thus cooled air through its outlet opening 120, opening 18 and duct 20, into room R whereby to lower the temperature therein, and thereupon to be again drawn into duct 16 for recooling and recirculation.

As the air passes beneath edge 33 and through coil 48, the cool refrigerant passing through the lower half section 76 thereof also extracts moisture from said air. However, the temperature of coil 76 never drops below thirty-five degrees, so that a condition requiring defrosting never obtains. Air is delivered to duct 20 at a temperature of approximately sixty degrees.

From the foregoing, it should therefore be apparent, that the system of the present invention provides novel means for the attainment of its objectives. The system has been thoroughly tested, and an installation thereof is operating successfully as of the filing date of this application.

It is noted that the embodiment illustrated and described obviously may be modified by those skilled in this art, without departing from the spirit of the invention, the scope of which is limited only by the appended claims.

What I claim is:

1. In a reverse cycle system for either heating or cooling an enclosed space: refrigeration apparatus including a compressor mounted in the lower compartment of a casing; a receiver tank also mounted in said lower compartment; a heat exchange unit supported within said tank; a coil mounted in the upper compartment of said casing, said coil including an upper and a lower half section, both said half sections together providing a condenser unit during heating cycles, said lower half section only providing an evaporator unit during cooling cycles; a coil buried in the ground remote from said casing, said coil providing an evaporator unit during heating cycles and a condenser unit during cooling cycles; conduit means for establishing fluid inter-communication between said compressor, said receiver tank, said heat exchange unit and said coils; a plurality of manually operable valves incorporated in the conduit means for regulating the flow therethrough of a volatile refrigerant hermetically sealed therein; a vertical wall in the casing for dividing said upper compartment into an inlet and an outlet chamber portion, said first named coil being mounted in said outlet chamber portion; and a blower assembly also mounted in the outlet chamber portion of the casing above first named coil.

2. A reverse cycle heating and cooling system, comprising in combination: a casing divided into an upper and a lower compartment; a horizontally disposed drain pan for separating said compartments; refrigeration apparatus including a sealed type compressor mounted in said lower compartment; a receiver tank and a heat exchanger within said tank also mounted in said lower compartment; a separation wall for dividing said upper compartment into an air intake chamber and an air exhaust chamber; a first coil mounted in said exhaust chamber, said coil including an upper and a lower half section, both said half sections combining to provide an evaporator unit during cooling cycles, said lower half section only providing an evaporator unit during cooling cycles; a second coil buried in the ground remote from said casing to a depth at which the ground temperature is approximately fifty degrees Fahrenheit, the latter coil providing an evaporator during heating cycles and a condenser during cooling cycles; conduit means for connecting said compressor, said tank and heat exchanger, said first and said second coils to form a unitary hollow system wherein is sealed a quantity of volatile refrigerant; a plurality of manually operable valves incorporated in the conduit means for controlling the flow of said refrigerant through said hollow system; and a blower assembly mounted in said exhaust chamber above the first coil aforesaid.

3. In a reverse cycle heating and cooling system of the character described: a refrigeration assembly including a compressor of the sealed type; a discharge line and a suction line leading from said compressor; a first condenser-evaporator coil consisting of an upper half and a lower half section; a first branch of the compressor discharge line leading to the upper half section of said coil, and provided with a manually operable valve which when open permits the flow of refrigerant from the compressor to the upper half section of said coil; a second condenser-evaporator coil buried in the ground below the frost level and remote from said compressor; a second branch of the compressor discharge line leading to said buried coil, and provided with a manually operable valve which when open permits the flow of refrigerant from the compressor to the buried coil; a receiver tank in the form of a closed cylindrical container; a heat-exchange unit suitably supported therein and including a closed cylindrical shell the diameter of which is smaller than that of said tank; a line leading from the buried coil passing through the tank and through one end wall of the shell for discharging refrigerant into the latter; a line passing through the other end wall of said shell and through the tank leading to the compressor suction line, and provided with a manually operable valve which when open permits the flow of refrigerant from said shell to said suction line; a branch leading from said last named line to the receiver tank, and provided with a manually operable valve which when open permits the discharge of refrigerant from said line into said tank; a line, passing through said tank and through said shell from end to end of the latter to terminate within said tank, leading from the lower half section of said first condenser-evaporator coil to said tank, and provided with a valve which when open permits the flow of refrigerant from said coil to said tank, said line also being in fluid communication with the suction line of the compressor; a heat exchange coil formed in said last-named line within the shell aforesaid; a line leading from said tank to the lower half section of the condenser-evaporator coil, and provided with a manually operable valve which when open permits the flow of refrigerant from said tank to the lower half section of said coil; an expansion valve interposed in the last-named line between the coil and the manual valve; a manually operable valve in said suction line which when open permits the flow of refrigerant from the first condenser-evaporator coil to the compressor; a conduit in fluid communication at one end with the line leading from the receiver tank to the lower half section of the first condenser-evaporator coil, and at its other end with said second branch of the compressor discharge line, and provided with a manually operable valve which when open permits the flow of refrigerant from said tank to the second condenser-evaporator coil; and an expansion valve interposed in said conduit between the manual valve and said last-named coil.

4. In a reverse cycle system for selectively heating or cooling a space remote therefrom, the combination of: a casing located in the basement of a building; refrigeration apparatus mounted in the casing, said apparatus including a compressor, a receiver tank, a heat-exchange unit suitably supported within the latter, a condenser-evaporator coil, and a blower assembly; a coil buried below frost level in the ground outside the building and in fluid communication with said apparatus; a horizontally disposed drain pan dividing the casing into a lower and an upper compartment; a vertically extending wall for dividing said upper compartment into an air inlet and an air outlet chamber, the lower end of said wall terminating above said pan; an air duct leading from said space to said inlet chamber; an air duct leading from said outlet chamber to said space; a plurality of manually operable valves for controlling the flow of a volatile refrigerant hermetically sealed within a hollow portion of said system; a valve controlled pipe for supplying water to said drain pan during heating cycles of operation; and a valve controlled pipe for draining off water from said pan during cooling cycles of operation; said condenser-evaporator coil comprising an upper half section and a lower half section, both said sections serving in condenser capacity when the system is operating on the heating cycle, but only the lower half section serving in evaporator capacity when the system is operating on the cooling cycle.

DOMINIC T. INTAGLIATA.

References Cited in the file of this patent
UNITED STATES PATENTS

| Number | Name | Date |
| --- | --- | --- |
| 2,071,178 | Roessler | Feb. 16, 1937 |
| 2,135,285 | Gibson | Nov. 1, 1938 |
| 2,385,667 | Webber | Sept. 25, 1945 |
| 2,401,890 | Smith | June 11, 1946 |
| 2,513,373 | Sporn et al. | July 4, 1950 |
| 2,556,104 | Ransdell | June 5, 1951 |
| 2,581,744 | Zimmerman | Jan. 8, 1952 |
| 2,585,748 | De Silvestro | Feb. 12, 1952 |